March 12, 1957     C. ULMANN     2,784,810
DEVICE FOR RESILIENTLY BRAKING ROTATING SHAFTS
Filed March 18, 1952     2 Sheets-Sheet 1

INVENTOR
CHARLES ULMANN
BY
Hazeltine, Lake & Co.
AGENTS

March 12, 1957 C. ULMANN 2,784,810
DEVICE FOR RESILIENTLY BRAKING ROTATING SHAFTS
Filed March 18, 1952 2 Sheets-Sheet 2
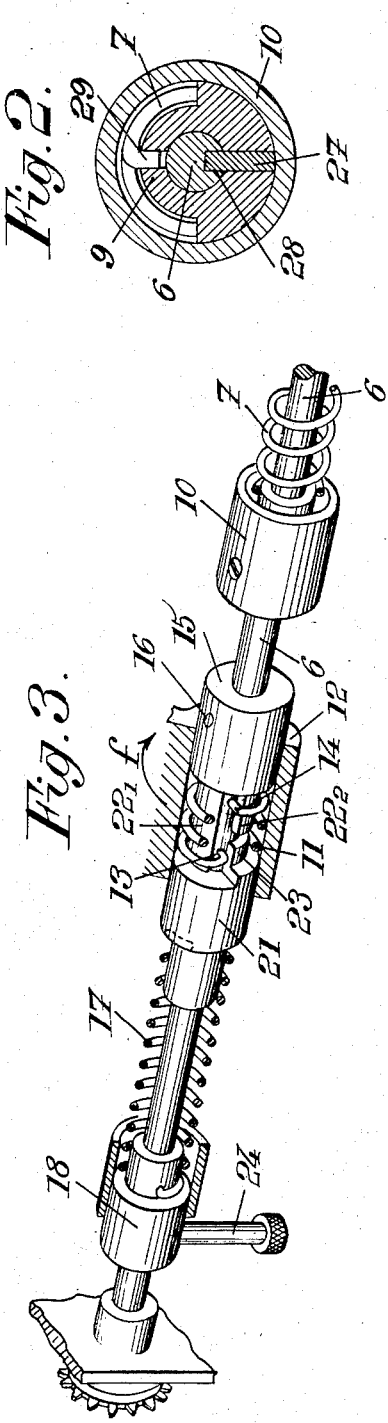
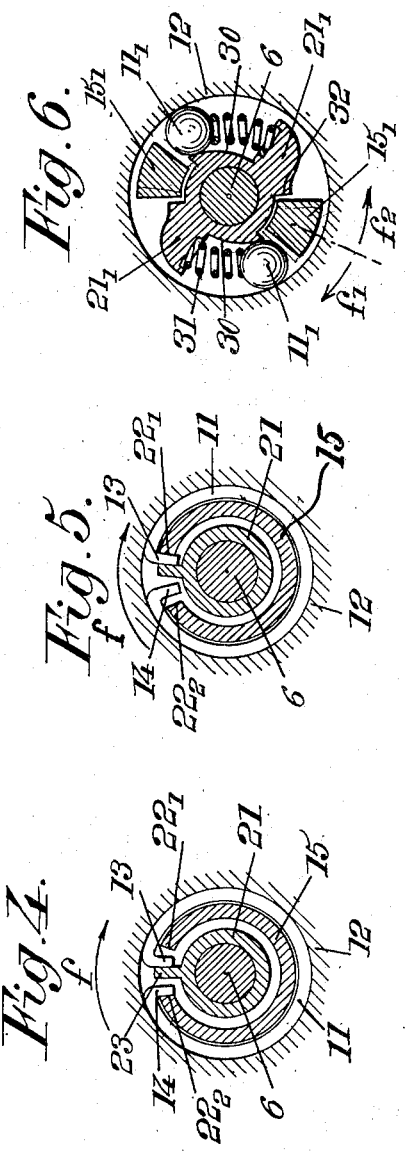
INVENTOR
CHARLES ULMANN
BY
Hazeltine, Lake & Co.
AGENTS United States Patent Office 2,784,810
Patented Mar. 12, 1957

2,784,810
DEVICE FOR RESILIENTLY BRAKING ROTATING SHAFTS

Charles Ulmann, Paris, France, assignor to Etablissements Klein & Cie, Paris (Seine), France, a society of the Republic of France Application March 18, 1952, Serial No. 277,214

Claims priority, application France March 21, 1951

5 Claims. (Cl. 188—166)

The present invention relates to operating devices for windows or other vertically slidable elements adapted to be held in any of their positions by automatic braking means, and in particular by a brake spring acting by wedging against the surface of a fixed part.

It is known, in such systems, to provide the slidable element, for instance a window element, with gravity compensating means which approximately balance its weight and to make use, in order to fix said window element in any desired position, of automatic braking means which keep it in this position. The slidable element is operated by means of a hand crank with which it is operatively connected, and this crank is also connected with the automatic braking means to make said means inoperative when the crank is rotated.

It is therefore possible, with such systems, to adjust the slidable element (window) to any desired position by means of the crank, but it is not possible to move it directly by means of a knob or handle carried by said element.

The chief object of the present invention is to provide an operating device of the type including automatic braking means which prevent movement of the movable element under the effect of a force applied thereto in one direction and of a limited value, said device permitting movement of said element in said direction where a higher force is applied directly thereto in said direction.

Preferred embodiments of my invention will be hereinafter described with reference to the appended drawings, given merely by way of example, and in which:

Fig. 2 is a cross section thereof, on the line II—II of Fig. 1;

Figure 1:
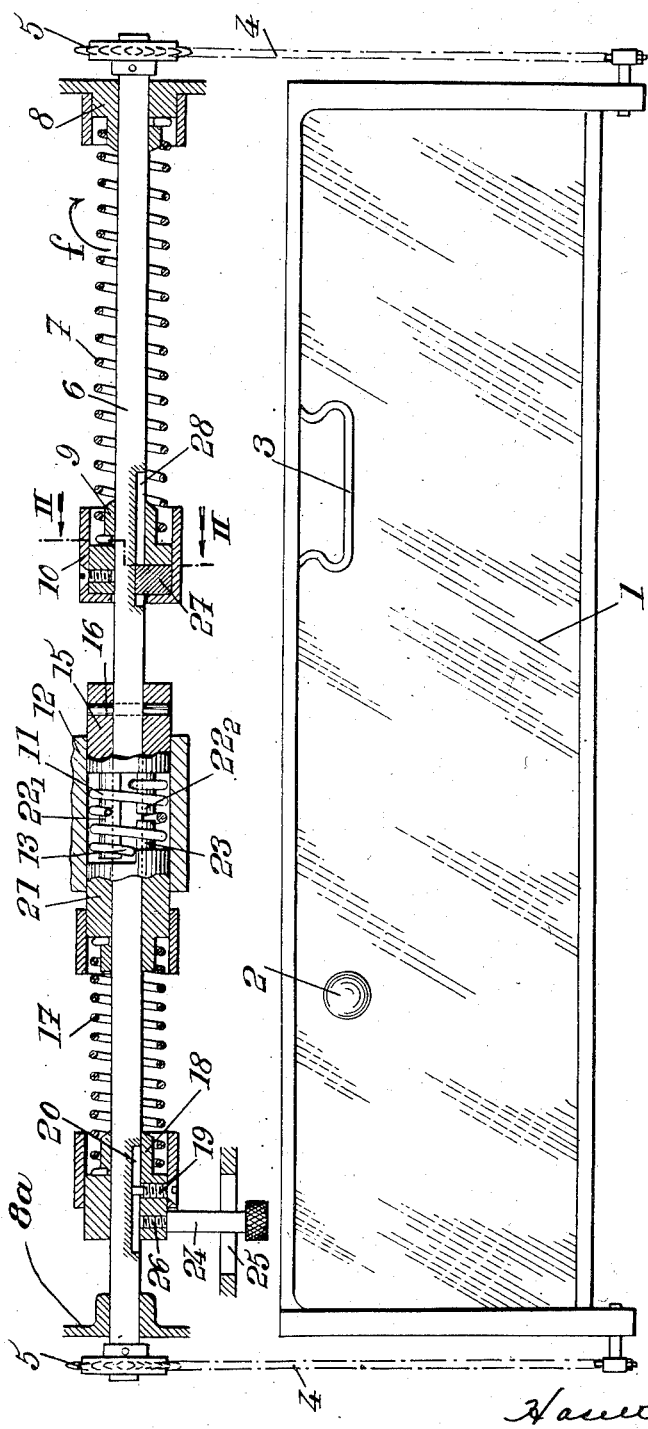
Fig. 1 is a vertical axial section of a window operating device according to my invention.

Fig. 3 separately shows in perspective view the essential parts of this device, some elements being simplified for the sake of clarity;

Figs. 4 and 5 are two diagrammatic cross sections of such a device, illustrating two different positions of operation;

Fig. 6 is a view similar to Fig. 4 illustrating another embodiment of my invention.

In the embodiment of my invention illustrated by Figs. 1–2, a sliding window 1, for instance a glass pane, provided with operating means such as a knob and/or a handle 3, is operatively connected through suitable means, constituted in this example by chains 4 and sprocket wheels 5, with a shaft 6 extending above the window opening and in the general plane thereof. Shaft 6 is journalled in supports 8, 8a belonging to a fixed structure (only shown by said supports 8, 8a) with respect to which said window 1 is slidable. Arrow f (Figs. 1, 3, 4 and 5) indicates the direction of rotation of shaft 6 which corresponds to a downward movement of window 1. The window is of course guided in its sliding movement through any conventional means, belonging to said fixed structure and which need not be shown by the drawings.

On this shaft is mounted a weight balancing device constituted by a torsional spring 7 one end of which is secured to support 8 and the other end of which is fixed to two coaxial members 9—10 rotating together with shaft 6. The action of this spring approximately balances the weight of window 1, but there is still a portion of the gravity force urging window 1 downwardly.

The automatic braking means include, in this embodiment of my invention, a brake spring 11 surrounding shaft 6 and which acts by wedging of its outer surface against the inner wall of a fixed sleeve 12 rigid with the fixed structure which includes supports 8, 8a. Both of the ends of spring 11 are bent to form radial fingers 13 and 14. As it is well known, such a brake spring wedges against the wall of the cylindrical recess (coaxial with shaft 6) provided in sleeve 12 when finger 13 is pushed in the direction of arrow f (corresponding to the action of gravity), so as to tend to rotate said spring 11 in said direction (f). On the contrary, when spring 11 is urged to rotate in this direction by a pulling action exerted on finger 14 in the direction of arrows f, said spring is unwedged and can slip in rotation (about the axis of shaft 6) along the wall of said cylindrical recess.

A sleeve 15 rigid with shaft 6, for instance keyed thereon by a pin 16, carries, integral therewith, two longitudinal extensions or projections $22_1$ and $22_2$, the first mentioned one, $22_1$, being longer than the other $22_2$, with a radial groove between these parts $22_1$ and $22_2$. Finger 13 bears against the edge of projection $22_1$ and finger 14 against the edge of projection $22_2$. Thus, when shaft 6 is rotated in the direction of arrow f, projection $22_2$ cooperating with finger 14, tends to reduce the diameter of spring 11 and thus to unwedge it from the wall of sleeve 12.

A stabilizing spring 17, also in the form of a torsional spring, is fixed at one end to a piece 18 keyed at 19, 20 to shaft 6 and at the other end to a member 21 freely rotatable both with respect to shaft 6 and with respect to sleeve 12. This member 21 carries, integral therewith, a projection 23 adapted to cooperate with finger 13. Spring 17 urges shaft 6, with respect to member 21, in the direction opposed to that of arrow f, i. e. it urges the projection 23 of member 21 and the projection $22_2$ of sleeve 15 away from each other. Under the effect of spring 17, projection 23 will tend to bear against finger 13 and to push it so as to wedge spring 11 against the wall of fixed sleeve 12 as shown by Fig. 5. But Figs. 3 and 4 show the parts in the relative position they occupy when window 1 is pulled downwardly (by means of element 2 or 3) so that the force urging shaft 6 in the direction of arrow f overcomes the torque exerted by spring 17.

The operation of such a device is illustrated by Figs. 4 and 5. For the sake of simplification, the structure of Figs. 4 and 5 is not exactly the same as that of Figs. 1 to 3 since, in Figs. 4 and 5 the two fingers formed by the ends of spring 11 are arranged to cooperate with the edges $22_1$ and $22_2$ of a longitudinal slot provided in sleeve 15, and piece 21 acts upon finger 13 through a radial projection 23, the direction in which piece 21 is urged by spring 17 with respect to shaft 6 being shown by arrow f. Fig. 4 shows the parts in a position corresponding to Fig. 3.

It will be supposed that, at rest, as illustrated by Fig. 5, shaft 6 is prevented from rotating in the direction of arrow f by brake spring 11 wedged against the inner wall of fixed sleeve 12 by the action of spring 17 which pushes finger 13 in direction f.

If now window 1 is acted upon, by means of operating means 2 or 3, to move it downwardly, shaft 6 is urged, through connecting means 4, 5, to rotate in the direction of arrow f (Fig. 4) with a force which overcomes the resistance of spring 17 and the edge (or projection) $22_2$ of sleeve 15 comes into contact with finger 14, pulling it in direction $f$ and unwedging brake spring 11.

It will be noted that when window 1 is acted upon in the upward direction, shaft 6 is urged in the direction opposed to that of arrow $f$ (Fig. 5) and the edge (or projection) $22_1$ of sleeve 15 pushes finger 13, against the action of spring 17, to unwedge spring 11.

When the window has been brought into the desired new position, it is released, and, the conditions become again as illustrated by Fig. 5. It should be noted that the braking action exerted by spring 11 is always the same, irrespective of the position of shaft 6, that is to say of the window, since this action is determined by the torque exerted by stabilizing spring 17.

According to another feature of my invention, this torque is adjustable at will, for instance to take into account modifications in the conditions of operation of the device or to adapt it to different uses.

For this purpose, the end 18 of spring 17 can be temporarily released from shaft 6 and held in fixed position. Rotation of said shaft through the desired angle then modifies the stressing of spring 17 and it suffices to disengage the end 18 of the spring from its temporary holding means and to fixt it again to shaft 6.

In the embodiment of my invention illustrated by Fig. 1, I make use for this purpose of a rod 24 which, when it is desired to proceed to this adjustment, is inserted from the outside at 25 and screwed at 26 into a threaded hole of piece 18 previously brought into correct position for this purpose. Piece 18 having thus been fixed, the screw 19 which fixes said piece in groove 20 can be unscrewed and the desired adjustment is made. Then screw 19 is screwed back into groove 20 and rod 24 is removed. I may provide several grooves 20 on the periphery of shaft 6 to obtain a fine adjustment. Of course screw 19 may be replaced by a pin.

According to still another feature of my invention, means are provided to compensate for the axial elongation of spring 7 caused by variation of its twisting.

For this purpose, member 9, to which is fixed one end of spring 7 is slidable, within limits, radially with respect to shaft 6 while rotating together therewith. For instance, as shown, a feather 27 is engaged both in a groove 28 of shaft 6 and in a slot provided in member 9. As shown by Fig. 2, the end of spring 7 is bent at 29 to engage into a hole provided in member 9. Member 10 is a sleeve surrounding the hole and preventing part 29 from escaping from the hole in member 9 in which it is engaged.

Thus the action of spring 7 is not perturbed by variations of its length due to its being more or less twisted.

Fig. 6 is a sectional view analogous to Fig. 4 and relating to a modification in which the automatic braking spring 11 is replaced by automatic wedging balls $11_1$. In this case, member 21 as above described is replaced by a member $21_1$ provided with arms on which bear springs 31 urging balls $11_1$ toward wedged position. Piece $21_1$ is provided with cam surfaces 30 so that these balls $11_1$ can be wedged between said cam surfaces and the inner wall of the cylindrical recess provided in fixed sleeve 12. The sleeve 15 of Figs. 1, 3, 4 and 5 is provided with longitudinal projections $15_1$.

At rest, piece $21_1$ is urged in the direction of arrow $f_1$ by the action of gravity transmitted through spring 17 and the wedging of balls $11_1$ prevents rotation of shaft 6. The strength of spring 17, which resiliently opposes rotation of shaft 6 in the direction of arrow $f_1$ with respect to member $21_1$, is such that projections $15_1$ are held out of contact with balls $11_1$. When shaft 6 is urged in the direction of arrow $f_1$ by a direct action exerted upon the window through operating means 2 or 3 and overcoming the resistance of spring 17, projections $15_1$, which rotate together with this shaft come into contact with balls $11_1$ and unwedge them. When on the contrary, window 1 is moved to rotate shaft 6 in the direction of arrow $f_2$, projections $15_1$ come into contact with flat surfaces 32 provided on piece $21_1$ and move this piece out of wedging position.

Of course, detail modifications may be brought to the device according to my invention. In particular, a constant and adjustable braking effort might be obtained through means other than spring 17 above referred to, for instance directly by braking spring 11.

In a general manner, while I have, in the above description, disclosed what I deem to be practical and efficient embodiments of my invention, it should be well understood that I do not wish to be limited thereto as there might be changes made in the arrangement, disposition and form the parts without departing from the principle of the present invention as comprehended within the scope of the accompanying claims.

What I claim is:

1. For use in connection with a shaft rotatable with respect to a fixed structure by which it is supported, a device to prevent rotation of said shaft with respect to said fixed structure in one direction in response to a limited torque applied to said shaft in said direction, said device being intended to yield to a higher torque applied to said shaft in said direction, which device comprises, in combination, a member carried by said fixed structure rotatable about the axis of said shaft with respect both to said shaft and to said fixed structure, resilient means interposed between said shaft and said member for creating between them a torque equal to said limited torque and tending to oppose rotation of said shaft with respect to said member in said above mentioned direction, braking means interposed between said member and said fixed structure for preventing rotation of said member with respect to said fixed structure in said direction, and cooperating abutment means carried by said shaft and said braking means respectively for placing said braking means out of action in response to a deformation of said resilient means corresponding to a given rotation of said shaft with respect to said member in said direction, whereby the application to said shaft of a torque in said direction higher than said limited torque causes said shaft to rotate in said direction with respect to said fixed structure.

2. A device according to claim 1 in which said resilient means are adjustable, whereby the value of said limited torque can be modified.

3. For use in connection with a shaft rotatable with respect to a fixed structure by which it is supported, a device to prevent rotation of said shaft with respect to said fixed structure in one direction in response to a limited torque applied to said shaft in said direction, said device being intended to yield to a higher torque applied to said shaft in said direction, which device comprises, in combination, a part rigid with said fixed structure provided with a cylindrical recess coaxial with said shaft, said part surrounding a portion of said shaft, a member carried by said fixed structure rotatable about the axis of said shaft with respect both to said shaft and to said fixed structure, at least a portion of said member being located in said recess, resilient means interposed between said shaft and said member for creating between them a torque equal to said limited torque and tending to oppose rotation of said shaft with respect to said member in said above mentioned direction, braking means in said recess interposed between said member and said fixed structure for preventing rotation of said member with respect to said fixed structure in said direction, and cooperating abutment means carried by said shaft and said braking means respectively for placing said braking means out of action in response to a deformation of said resilient means corresponding to a given rotation of said shaft with respect to said member in said direction, whereby the application to said shaft of a torque in said direction higher than said limited torque causes said shaft to rotate in said direction with respect to said fixed structure.

4. For use in connection with a shaft rotatable with respect to a fixed structure by which it is supported, a device to prevent rotation of said shaft with respect to said fixed structure in one direction in response to a limited torque applied to said shaft in said direction, said device being intended to yield to a higher torque applied to said shaft in said direction, which device comprises, in combination, a part fixed with respect to said supporting structure and provided with a cylindrical recess coaxial with said shaft, a helical brake spring mounted coaxially in said recess in contact with the wall thereof, said spring being so dimensioned and mounted in said recess and the frictional relation between the contacting surfaces of said spring and said wall being so determined that a thrust exerted on one end of said spring so as to urge it to rotate about the axis of said shaft in said direction causes said spring to wedge against said wall, whereas a pull exerted on the other end of said spring so as to urge it to rotate about said axis in said direction unwedges it and causes it to rotate in said direction by slipping along said wall, a member carried by said fixed structure rotatable about the axis of said shaft with respect both to said shaft and to said fixed structure, cooperating abutment means carried by said member and said first mentioned end of said brake spring, respectively, for transmitting torques about said axis and in said direction from said member to said spring, cooperating abutment means carried by said shaft and said second mentioned end of said brake spring for transmitting torques about said axis and in said direction from said shaft to said spring, and spring means interposed between said shaft and said member for creating between them a torque equal to said limited torque and tending to produce an angular offsetting of said shaft with respect to said member in a direction opposed to said direction, said offsetting being such as to leave said second mentioned abutment means out of operation when said first mentioned abutment means are in operation.

5. For use in connection with a shaft rotatable with respect to a fixed structure by which it is supported, a device to prevent rotation of said shaft with respect to said fixed structure in one direction in response to a limited torque applied to said shaft in said direction, said device being intended to yield to a higher torque applied to said shaft in said direction, which device comprises, in combination, a part fixed with respect to said supporting structure and provided with a cylindrical recess coaxial with said shaft, said part surrounding a portion of said shaft, a member carried by said shaft portion and located inside said recess, said member being rotatable about the axis of said shaft with respect both to said shaft and to said fixed structure, resilient means interposed between said shaft and said member for creating between them a torque equal to said limited torque and tending to oppose rotation of said shaft with respect to said member in said above mentioned direction, the outer surface of said member, which is facing the wall of said recess forming at least one section along which the radial distance from said surface to said wall decreases gradually in the direction opposed to said first mentioned direction, at least one ball interposed between said surface and said wall so as to be wedged between them when said member tends to rotate in said first mentioned direction with respect to said fixed structure, a spring interposed between said member and said ball for urging said ball toward wedging position, and an abutment rigid with said shaft and extending into the space between said surface and said wall on the other side of said ball from said spring for pushing said ball out of wedging position in response to a deformation of said resilient means corresponding to a given rotation of said shaft with respect to said member in said direction, whereby the application to said shaft of a torque in said first mentioned direction higher than said limited torque causes said shaft to rotate in said first mentioned direction with respect to said fixed structure.

References Cited in the file of this patent

UNITED STATES PATENTS

| | | |
|---|---|---|
| 416,207 | Bastian | Dec. 3, 1889 |
| 469,598 | Rose | Feb. 23, 1892 |
| 1,826,462 | Dixon et al. | Oct. 6, 1931 |
| 1,855,057 | Karsten et al. | Apr. 19, 1932 |
| 2,262,914 | Bellman et al. | Nov. 18, 1941 |
| 2,453,424 | Foster | Nov. 9, 1948 |